United States Patent [19]
Viets

[11] 3,926,373
[45] Dec. 16, 1975

[54] THRUST AUGMENTATION SYSTEM WITH OSCILLATING JET NOZZLES

[75] Inventor: Hermann Viets, Dayton, Ohio

[73] Assignee: The United States of America as represented by the Secretary of the Air Force, Washington, D.C.

[22] Filed: July 26, 1974

[21] Appl. No.: 492,078

[52] U.S. Cl. ........... 239/265.17; 417/179; 431/354; 137/835
[51] Int. Cl.² ......................................... B64C 15/10
[58] Field of Search ........... 137/815, 835, 834, 826; 239/419.5, 429, 265.17, DIG. 3, DIG. 7; 417/151, 176, 179, 180, 198; 431/354, 355; 48/180 R, 180 H, 180 P, 180 B, 180 M, 180 S

[56] References Cited
UNITED STATES PATENTS

| | | | |
|---|---|---|---|
| 3,016,066 | 1/1962 | Warren | 137/835 X |
| 3,423,026 | 1/1969 | Carpenter | 239/DIG. 3 |
| 3,525,474 | 8/1970 | Von Ohain et al. | 417/179 |
| 3,834,834 | 9/1974 | Quinn | 417/198 X |

Primary Examiner—William R. Cline
Attorney, Agent, or Firm—Joseph E. Rusz; Richard J. Killoren

[57] ABSTRACT

A thrust augmentation system having a thrust augmentation duct with an inlet section, a mixing section and a diffuser section. A plurality of primary gas jets are directed into the thrust augmentation duct, from a plurality of nozzles, to entrain secondary air to increase the thrust from said duct. A pair of control ports are provided on the sides of the gas jet in each of the nozzles. A feedback loop is connected between each pair of control ports.

3 Claims, 8 Drawing Figures

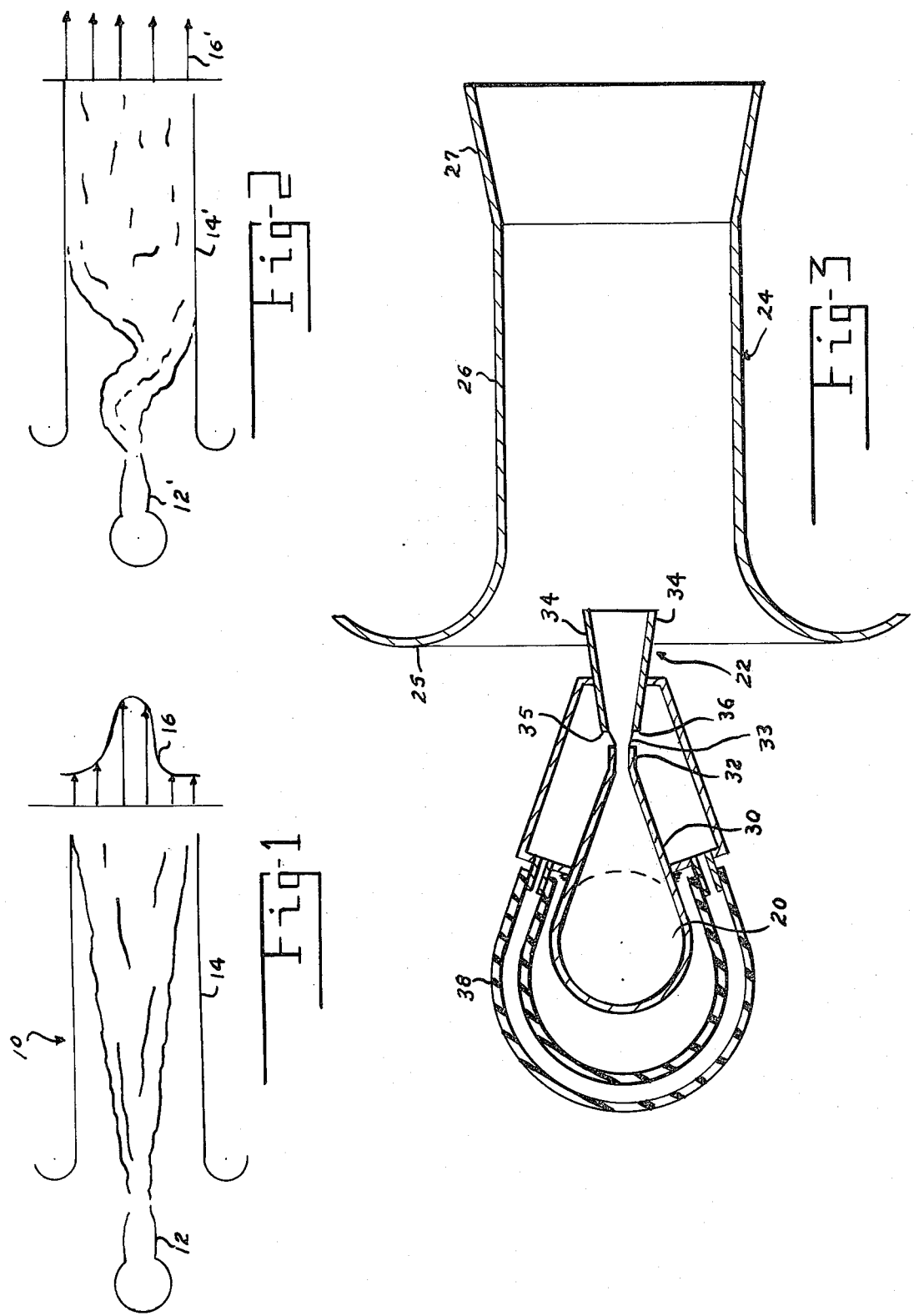

THRUST AUGMENTATION SYSTEM WITH OSCILLATING JET NOZZLES

BACKGROUND OF THE INVENTION

In thrust augmentation systems, there is a problem of obtaining good mixing between the primary gas jet and the secondary air flow. Various means have been used in the prior art to achieve good mixing in the mixing region of a shrouded thrust chamber. Prior art systems have used a plurality of nozzles to direct air along different trajectories within the thrust chamber or chopper means in the primary jet nozzle to provide a pulsed jet.

BRIEF DESCRIPTION OF THE INVENTION

According to this invention, a plurality of jet nozzles are provided to direct gas jets into a thrust augmentation duct. Each jet has a tuned oscillating control fluidic circuit to cause the gas jet to oscillate in the thrust augmentation duct.

IN THE DRAWINGS

FIG. 1 is a schematic diagram of a prior art thrust augmentation system.

FIG. 2 is a schematic diagram of a thrust augmentation system according to this invention.

FIG. 3 is a partially schematic sectional view of thrust augmentation system with an oscillating gas jet nozzle according to the invention.

Figure 4:
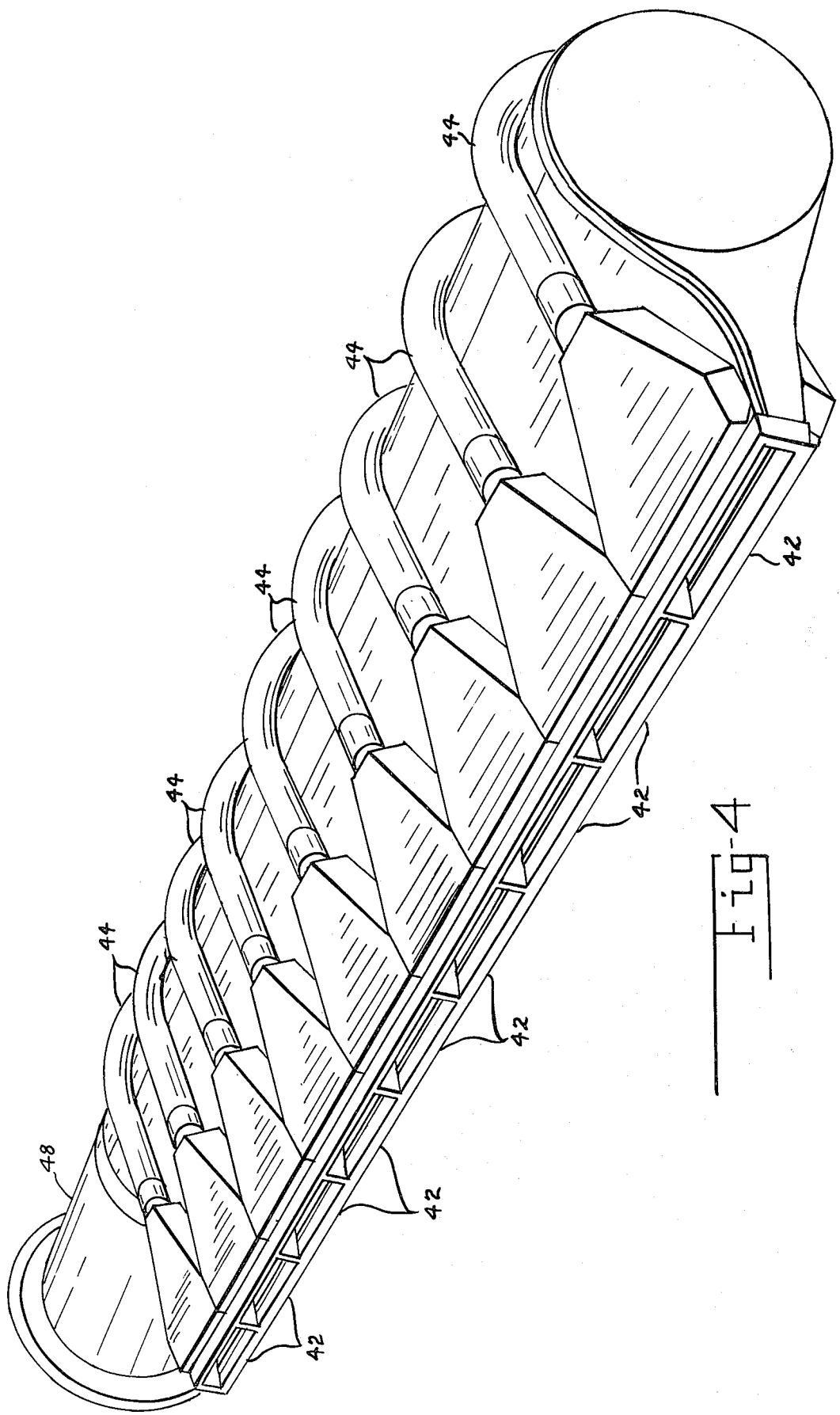
FIG. 4 is an isometric view of a gas jet system according to the invention for providing a plurality of oscillating gas jets.

Reference is now made to FIG. 1 of the drawing which shows a prior art thrust system 10 wherein a primary gas jet from a stationary nozzle 12 is directed into a shrouded thrust chamber 14, to entrain secondary air so as to augment the thrust. The velocity profile at the thrust chamber exit is nonuniform as shown at 16.

The schematic showing in FIG. 2 of the drawing shows an oscillating primary gas jet from nozzle 12', such as provided in the device of this invention, which results in increased mixing in the thrust chamber 14' to provide a more uniform velocity profile at the thrust chamber exit as shown at 16'.

The oscillating jet is provided in a manner shown in FIG. 3. Primary air from tubular element 20 is directed through a nozzle 22 into a thrust chamber 24, having an inlet region 25, a mixing region 26 and a diffuser region 27.

The nozzle 22 has a converging section 30, a straight section 32, a rapid expansion section 33 and wall members 34 for attachment of the jet. Control ports 35 and 36 are provided in the nozzle 22 adjacent to the rapid expansion section of the nozzle. A feedback loop 38 is connected between the control ports 35 and 36. The apparatus for providing an oscillating gas jet is similar to the fluidic oscillator shown on page 65 of "An Introduction to Fluid Logic" by N. M. Morris, except that the flow splitter has been removed.

In the operation of the device, the gas jet leaving straight section 32 attaches to one of the walls 34. A rarefaction wave develops in the port adjacent the side where the jet attaches and a pressure wave develops in the opposite port. These waves travel in opposite directions through the feedback loop 38 and cause the gas jet to switch to the other wall. The conditions are then reversed so as to cause the jet to switch back again. In this manner, the output jet of nozzle 22 is switched back and forth in thrust chamber 24 to provide increased mixing with the secondary flow through thrust chamber 24.

The frequency, of the oscillations, varies inversely with the length of the feedback loop. For shorter feedback loops, the amount of time it takes for the jet to flip from one wall to the other, after the pressure waves arrive, becomes a significant portion of the period and the relationship of frequency to feedback length deviates from a linear dependence. However, for greater length the proportionality is practically linear. The frequency was also found to change with changes in stagnation pressure. However, the frequency rise with stagnation pressure appears to approach an asymptote.

Figure 5:
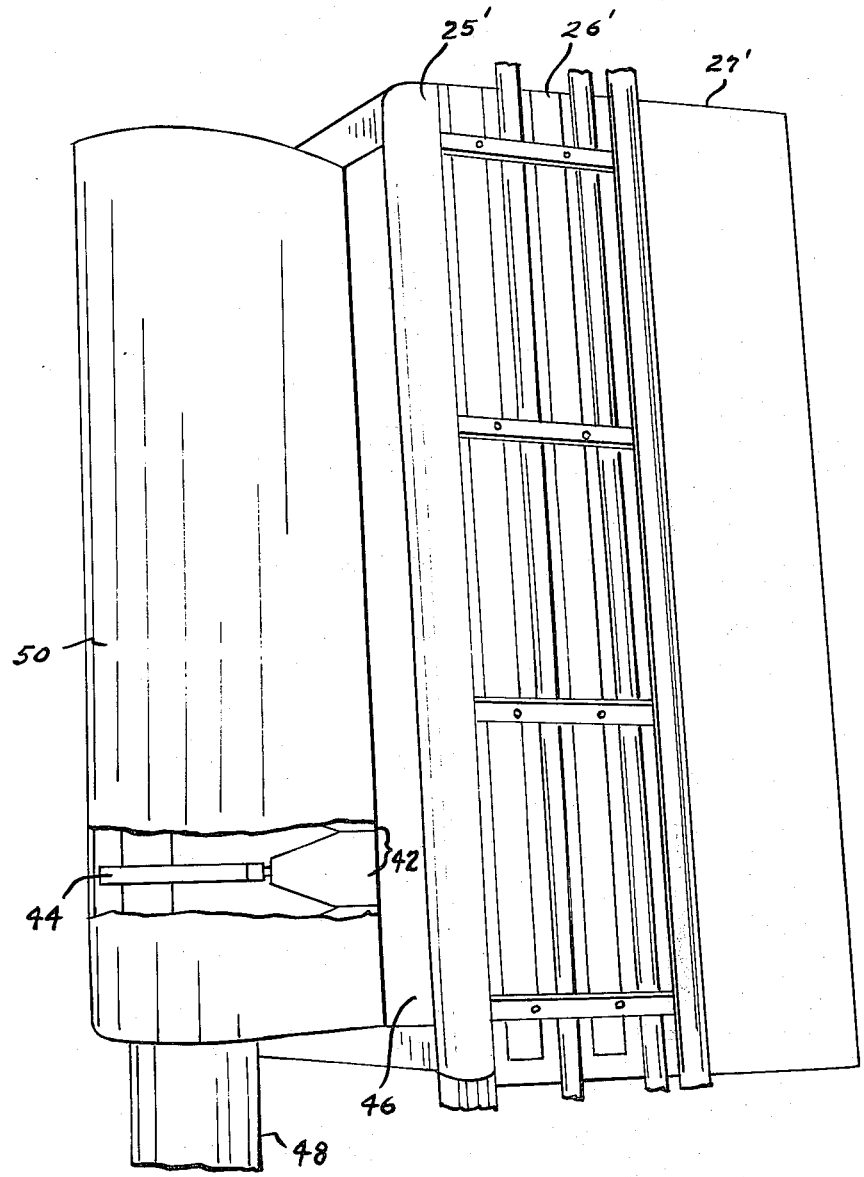
FIG. 5 shows a partially cut away view of the gas jet system of FIG. 4 in a thrust augmentation system according to the invention.

One augmented thrust device which was constructed and tested is shown in FIGS. 4 and 5. A plurality of nozzles 42, having control ports, as shown in FIG. 3, and which are interconnected by feedback loops 44 are positioned side by side at the inlet to a thrust chamber 46. The nozzles are fed from a common duct 48. Though the duct 48 is shown with an inlet at one end only greater uniformity of flow, in the nozzles, can be obtained by providing feed inlets at both ends.

The output of the nozzles 42 is directed into a thrust chamber 46 having an inlet region 25', a mixing region 26' and a diffuser region 27'. A cowling 50 covers the duct 48 and feedback loops 44 to provide a smooth inlet into the thrust chamber 46.

This device operates in a manner similar to that described above. Each nozzle element oscillates independently and has no specific phase relationship with the nozzles on either side of it.

While the feedback loops have been shown as passing around the element 20, for some applications, higher frequencies might be desired in which case the feedback loop may be made to pass through the element 20 or the section 30 of nozzles 22.

Figure 6:
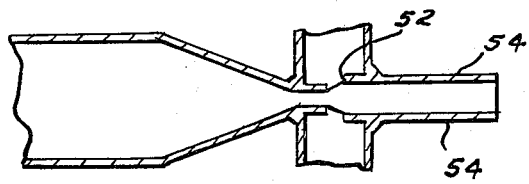
FIG. 6 shows a modified nozzle construction which may be used with the devices of FIGS. 3 and 4.
Figure 7:
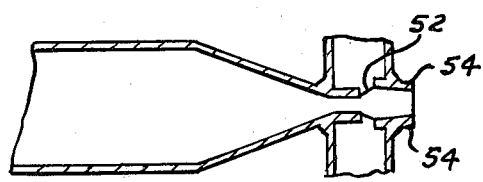
FIG. 7 shows another modification of a nozzle construction which may be used with the devices of FIGS. 3 and 4.
Figure 8:
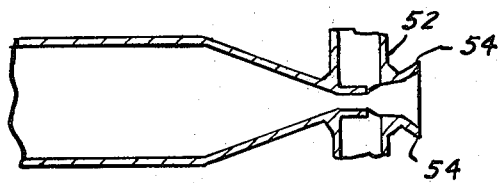
FIG. 8 shows a further modification of a nozzle construction which may be used with the devices of FIGS. 3 and 4.

Also, the configuration of nozzle 22 may be other than that shown in FIG. 3. The nozzle configuration shown in FIGS. 6, 7 and 8 have been constructed and operated. Each of these nozzle configurations have a rapidly diverging portion 52 adjacent the control ports so that the jet will attach to the walls 54.

While the oscillating nozzle has been described for use in a thrust augmentation system, it could also be used in other systems wherein it is desirable to mix a gas jet from a nozzle with a gas in a chamber or a housing.

There is thus provided a thrust augmentation system for providing increased mixing between a primary gas flow and secondary flow in a thrust chamber.

I claim:

1. A thrust augmentation system comprising; a thrust chamber having an inlet region, a mixing region and a diffuser region; at least one nozzle for directing an oscillating gas jet into said inlet region in a substantially longitudinal direction through said thrust chamber to thereby entrain a secondary flow of air through said thrust chamber; said nozzle including a converging section, a straight section, a sudden expansion section and wall members extending forward of said sudden expansion section; means for directing a flow of gas through said nozzle; a pair of opposed control ports in said nozzle adjacent the inlet to said sudden expansion section; means for forming a feedback loop interconnecting said control ports.

2. The device as recited in claim 1 having an elongated thrust chamber with a plurality of nozzles with exit slots extending in a substantially straight line, for directing gas jets into said thrust chamber; each of said nozzles having a converging section followed by a straight section, a sudden expansion section and wall members extending forward of the sudden expansion with a pair of control ports for each nozzle adjacent to the sudden expansion section; a feedback loop interconnecting the pair of control ports of each nozzle, a gas supply duct connected to the converging section of each of said nozzles; means, surrounding said supply duct and said feedback loops, for providing a smooth inlet to said thrust chamber.

3. The device as recited in claim 2 wherein said feedback loops pass around the outside of said supply duct.

* * * * *